United States Patent
Ge et al.

(10) Patent No.: US 10,521,711 B1
(45) Date of Patent: Dec. 31, 2019

(54) CONTROLLABLE READ BLOCKING BASED RADIO-FREQUENCY IDENTIFICATION

(71) Applicant: Hewlett-Packard Development Company, L.P., Spring, TX (US)

(72) Inventors: Ning Ge, Palo Alto, CA (US); Jarrid Wittkopf, Palo Alto, CA (US); Robert Ionescu, Palo Alto, CA (US); Helen A. Holder, Palo Alto, CA (US); Paul Howard Mazurkiewicz, Ft. Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/463,525

(22) PCT Filed: Feb. 22, 2017

(86) PCT No.: PCT/US2017/018828
§ 371 (c)(1),
(2) Date: May 23, 2019

(87) PCT Pub. No.: WO2018/156110
PCT Pub. Date: Aug. 30, 2018

(51) Int. Cl.
*G06K 19/073* (2006.01)
*G06K 7/10* (2006.01)
(52) U.S. Cl.
CPC ... *G06K 19/07318* (2013.01); *G06K 7/10366* (2013.01)
(58) Field of Classification Search
None
See application file for complete search history.

(56) References Cited

U.S. PATENT DOCUMENTS

| 7,479,882 | B2 | 1/2009 | Mahaffey |
| 8,833,664 | B2 | 9/2014 | Choi |
| 8,842,056 | B2 | 9/2014 | Batchelor et al. |
| 9,098,790 | B2 | 8/2015 | Nyalamadugu et al. |
| 9,165,235 | B2 | 10/2015 | Biro et al. |
| 2008/0266107 | A1* | 10/2008 | Rodgers ............ A61B 5/0031 340/572.8 |
| 2010/0148859 | A1 | 6/2010 | Cleeves et al. |
| 2011/0254665 | A1* | 10/2011 | Lindsay ............ G06K 19/0717 340/10.5 |
| 2013/0176115 | A1 | 7/2013 | Puleston et al. |

OTHER PUBLICATIONS

McDowell, G., Don't Let Them Scan You: Blocking RFID Chips, Mar. 26, 2013, <http://www.makeuseof.com/tag/dont-let-them-scan-you-blocking-rfid-chips/ >.

* cited by examiner

*Primary Examiner* — Kristy A Haupt
(74) *Attorney, Agent, or Firm* — Mannava & Kang

(57) ABSTRACT

In some examples, a controllable read blocking based radio-frequency identification (RFID) device may include a substrate layer, and a trace formed of a conductive material and disposed on, partially within, or fully within the substrate layer. The controllable read blocking based RFID device may further include a controllable read blocking layer disposed on the substrate layer and the trace and including a fluid disposed in the controllable read blocking layer to selectively block or allow passage of electromagnetic waves to the trace to respectively inhibit or allow communication of a RFID reading device with the controllable read blocking based RFID device.

15 Claims, 10 Drawing Sheets

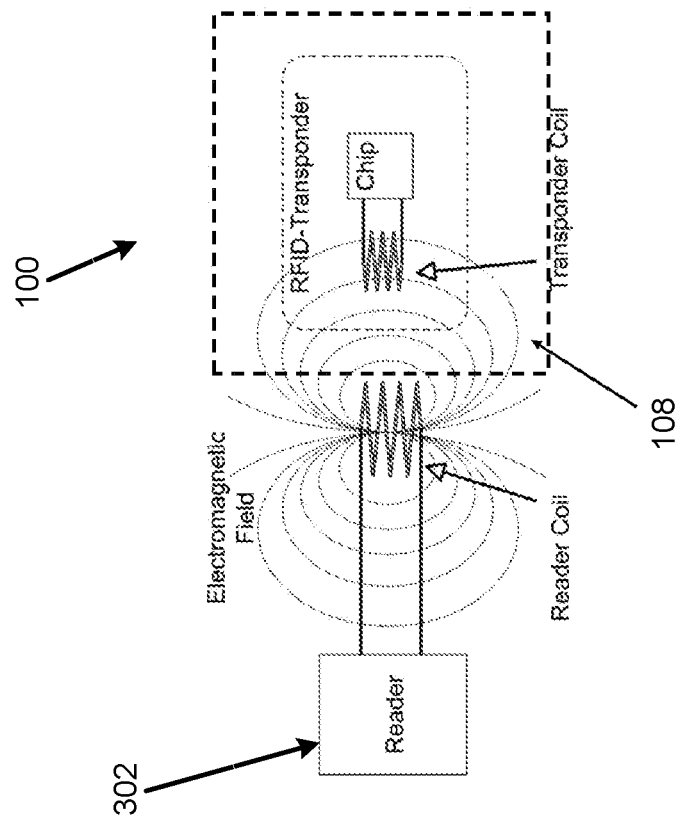
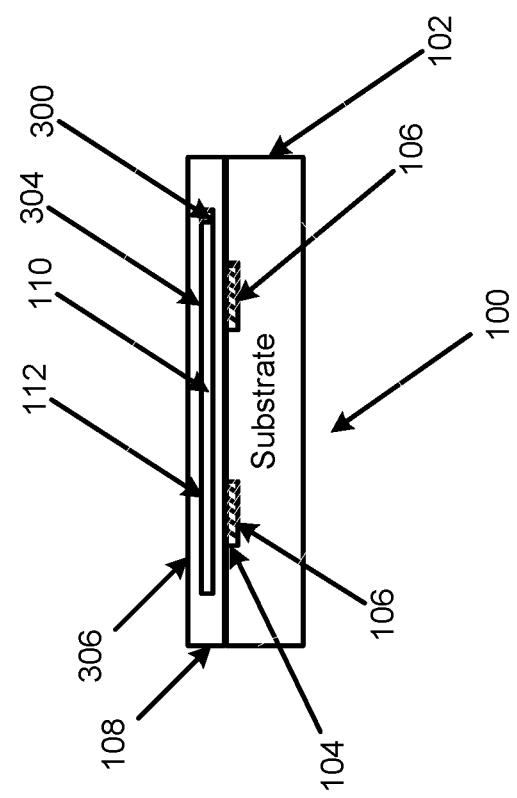
FIG. 3B
FIG. 3A

1000

FORM A TRACE THAT INCLUDES A CONDUCTIVE MATERIAL
1002

PLACE A FLUID IN A CONTROLLABLE READ BLOCKING LAYER DISPOSED ON THE SUBSTRATE LAYER AND THE TRACE TO SELECTIVELY BLOCK OR ALLOW PASSAGE OF ELECTROMAGNETIC WAVES TO THE TRACE TO RESPECTIVELY INHIBIT OR ALLOW COMMUNICATION OF A RFID READING DEVICE WITH THE CONTROLLABLE READ BLOCKING BASED RFID DEVICE
1004

CONTROLLABLE READ BLOCKING BASED RADIO-FREQUENCY IDENTIFICATION

BACKGROUND

Radio-frequency identification (RFID) may use electromagnetic fields to identify and track tags attached to objects. The tags may include electronically stored information. Examples of tags include passive tags that collect energy from a nearby RFID reader's interrogating radio waves, and active tags that include a local power source such as a battery. RFID tags may be used in many industries, such as automotive, pharmaceutical, farming, etc.

BRIEF DESCRIPTION OF DRAWINGS

Features of the present disclosure are illustrated by way of example and not limited in the following figure(s), in which like numerals indicate like elements, in which:

FIG. 3A illustrates a layout of a cutout view of FIG. 2 illustrating a sealed reservoir, and FIG. 3B illustrates operation of the controllable read blocking based RFID device of FIG. 1, according to an example of the present disclosure;

DETAILED DESCRIPTION

Figure 1:
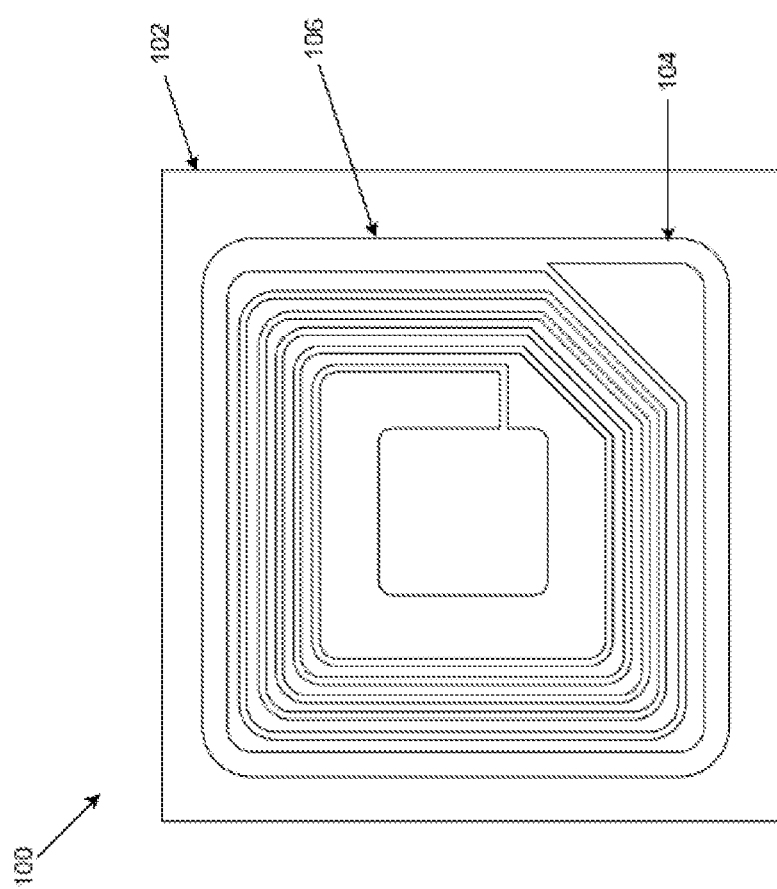
FIG. 1 illustrates a layout of a controllable read blocking based radio-frequency identification (RFID) device, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A controllable read blocking based RFID device, and a method for forming a controllable read blocking based RFID device are disclosed herein. According to an example, the disclosed RFID device may include a substrate layer, and a trace formed of a conductive material. The trace may be disposed on, partially within, or fully within the substrate layer. Further, a controllable read blocking layer may be disposed on the substrate layer and the trace, and include a fluid disposed in the controllable read blocking layer to selectively block or allow passage of electromagnetic waves to the trace to respectively inhibit or allow communication of a RFID reading device with the controllable read blocking based RFID device. The fluid may include, for example, a salt water solution to inhibit communication of a RFID reading device with the controllable read blocking based RFID device. According to an example, the fluid may be mechanically removed from the RFID device, for example, via a valve so that once the fluid is removed, the RFID device is no longer shielded (i.e., a RFID reading device may communicate with the controllable read blocking based RFID device). According to another example, two fluids may be disposed in sealed reservoirs in the controllable read blocking layer so that once the contents of the sealed reservoirs are mixed, the RFID device is no longer shielded. In this case, mixing of the two fluids may cause a conductive fluid, which provides for shielding against electromagnetic waves, to lose its conductivity. In another example, mixing of the two fluids may cause conductive particles to solidify. According to a further example, two fluids including different weights may be disposed in reservoirs in the controllable read blocking layer so that rotation of the RFID device between shielding and non-shielding positions (i.e., first and second configurations as disclosed herein) causes one fluid to rise and another to fall to inhibit or allow passage of electromagnetic waves.

The controllable read blocking RFID device may be used, for example, to provide privacy over the unauthorized reading of RFID devices. In this regard, unauthorized readers may potentially use RFID information to identify or track packages, consumers, carriers, or the contents of a package. The controllable read blocking RFID device may address such RFID security concerns with respect to the illicit tracking of RFID devices. Further, the controllable read blocking RFID device may be used to minimize risks associated with personal location privacy and/or corporate/military security by selectively blocking or allowing passage of electromagnetic waves to respectively inhibit or allow communication of a RFID reading device with the controllable read blocking based RFID device.

FIG. 1 illustrates a layout of a controllable read blocking based radio-frequency identification (RFID) device (hereinafter also referred to as "device 100"), according to an example of the present disclosure.

Referring to FIG. 1, the device 100 may include a substrate layer 102 including a channel 104. Alternatively, the device 100 may be formed without the channel 104. The substrate layer 102 may be formed of a flexible, semiflexible, or rigid material. For example, the substrate layer 102 may be formed of materials such as Polydimethylsiloxane (PDMS), etc.

The device 100 may further include a trace 106 formed of a conductive material that is disposed substantially within the channel 104. Alternatively, for a device 100 that does not include the channel 104, the trace 106 may be formed of a conductive material deposited or otherwise disposed on, partially within, or fully within the substrate layer 102.

In the example of FIG. 1, the trace 106 may form a generally larger width square shaped pattern along the outer boundaries, and generally smaller width square shaped patterns within the boundaries defined by the generally larger width square shaped pattern. A variety of other patterns may be formed without departing from the scope of the device 100 of FIG. 1. For example, triangular, rectangular, and other geometrically shaped patterns may be formed without departing from the scope of the device 100 of FIG. 1. Generally, the pattern of the trace 106 may be defined based on a specific encoding that is associated with the device 100 to identify the device 100.

Figure 2:
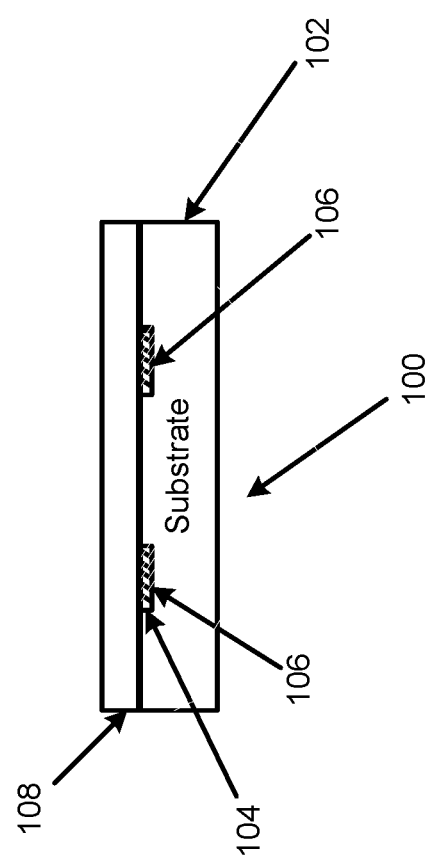
FIG. 2 illustrates a side view of a portion of the controllable read blocking based RFID device of FIG. 1, according to an example of the present disclosure.

FIG. 2 illustrates a side view of a portion of the device 100, according to an example of the present disclosure. Further, FIG. 3A illustrates a layout of a cutout view of FIG. 2 illustrating a sealed reservoir, and FIG. 3B illustrates operation of the device 100, according to an example of the present disclosure.

Referring to FIGS. 1-3B, the device 100 may include a controllable read blocking layer 108 (see FIGS. 2 and 3A) disposed on the substrate layer 102 and the trace 106, and including a fluid 110 (see FIG. 3A, where the fluid 110 is disposed in a sealed reservoir 112) disposed in the controllable read blocking layer 108. The fluid 110 may selectively block or allow passage of electromagnetic waves to the trace 106 to respectively inhibit or allow communication of a RFID reading device with the device 100.

According to an example, the substrate layer 102, the trace 106, and/or the controllable read blocking layer 108 may be formed of a transparent material.

The fluid 110 may include a conductive liquid to block electromagnetic waves. For example, with respect to blockage of electromagnetic waves at ultra high frequencies (e.g., in the range of 860 MHz to 960 MHz), the fluid 110 may include aqueous based solvents (e.g., water, low molecular weight alcohol, salt solutions, etc.), where the molecular interaction of the electromagnetic waves may result in blockage of the electromagnetic waves. With respect to blockage of lower frequencies (e.g., frequencies in the range of 125 kHz to 134 kHz), as well as other frequencies, the fluid 110 may similarly include aqueous based solvents (e.g., water, low molecular weight alcohol, salt solutions, etc.), where the interaction of the electromagnetic waves with the aqueous based solvents may result in blockage of the electromagnetic waves. The dissolved species (ions in solution) may interact with the lower frequency electromagnetic energy being set at the device 100. This aspect may decrease the signal strength enough to prevent the device 100 from either gaining enough energy to turn off or send a strong enough response for a reader to read.

Further examples of the fluid 110 may include fluids such as Potassium chloride (KCl) solution (0.1 n) including a conductivity of approximately 1.05 siemens per meter (S/m), Sodium Chloride (NaCl) solution (saturated) including a conductivity of approximately 20.14 S/m, Sodium hydroxide (NaOH) solution (saturated) including a conductivity of approximately 41.2 S/m, Hydrogen chloride (HCl) (saturated) including a conductivity of approximately 852000 S/m, Ethyl alcohol including a conductivity of approximately $3.3 \times 10^{-4}$ S/m, deionized (DI) water including a conductivity of approximately $2 \times 10^{-4}$ S/m, poly(3,4-ethylenedioxythiophene) polystyrene sulfonate (PDOT:PSS) including a conductivity of approximately $4.6 \times 10^{5}$ S/m, and other such conductive fluids.

The fluid 110 that is selected for the device 100 may be selected to specifically tune the device 100 to block or allow specific electromagnetic waves. For example, as disclosed herein, with respect to blockage of electromagnetic waves at ultra high frequencies (e.g., in the range of 860 MHz to 960 MHz), the fluid 110 may include aqueous based solvents (e.g., water, low molecular weight alcohol, salt solutions, etc.), where the molecular interaction of the electromagnetic waves may result in blockage of the electromagnetic waves.

The device 100 may be configured for one-time usage (e.g., from blocking to allowing passage of electromagnetic waves). However, with respect to the discussion herein, it will be appreciated that various combinations of the device 100 as disclosed herein with reference to FIGS. 1-6 may be implemented to provide for one-time usage to block or allow passage of electromagnetic waves, as well as for switchable (i.e., multiple) usage.

Referring to FIGS. 1-3B, and particularly FIG. 3A, with respect to the device 100 configured for one-time usage, the fluid 110 may be removed (e.g., by draining) from the controllable read blocking layer 108. For example, the fluid 110 may be removed via a valve 300 which may be opened to remove the fluid 110 from the controllable read blocking layer 108. In this regard, the valve 300 may be operably connected to the sealed reservoir 112 to release the fluid 110 from the sealed reservoir 112 upon actuation of the valve 300 to allow passage of electromagnetic waves to the trace 106 to allow communication of an RFID reading device 302 with the device 100. For example, FIG. 3B illustrates a RFID reading device 302 in communication with the device 100, where the RFID reading device 302 may be used to read the device 100 when the valve 300 releases the fluid 110 from the sealed reservoir 112. Otherwise, the controllable read blocking layer 108 may block passage of electromagnetic waves to the trace 106 to inhibit communication of the RFID reading device 302 with the device 100.

According to another example, the fluid 110 may be removed from the controllable read blocking layer 108 by punching (or otherwise piercing) the sealed reservoir 112 which includes the fluid 110. For example, the sealed reservoir 112 may be formed of a material that is pierceable to release the fluid 110 from the sealed reservoir 112 to allow passage of electromagnetic waves to the trace 106 to allow communication of the RFID reading device 302 with the device 100.

Referring again to FIGS. 1-3B, and particularly FIG. 3A, with respect to the device 100 configured for one-time usage, the fluid 110 may be disposed in the sealed reservoir 112 that includes a membrane, for example, along surface 304 to outer surface 306 (or an intermediate position, or another location) of the controllable read blocking layer 108, that is permeable or desiccating. For example, a permeable membrane may allow for the fluid 110 to pass therethrough so that no fluid 110 remains in the sealed reservoir 112. In the case of the membrane being formed of a desiccating material, a desiccant may be described as a hygroscopic substance that induces or sustains a state of dryness (desiccation) in its vicinity. The desiccating membrane may cause the fluid 110 to dry, thus rendering the contents of the sealed reservoir 112 neutral. In either case, the permeability and/or desiccation properties of the membrane may be actuated, for example, by opening the valve 300 so that the fluid 110 contacts the membrane. Once the fluid 110 is released from the sealed reservoir 112, controllable read blocking layer 108 allows for passage of electromagnetic waves to the trace 106 to allow communication of the RFID reading device 302 with the device 100.

With respect to the device 100 illustrated in FIGS. 3A and 3B (as well as the device 100 illustrated in FIGS. 4A-5), the device 100 may be reused, for example, by re-injection of the fluid 110 into the sealed reservoir 112, and closing of the valve 300.

Figures 4A, 4B:
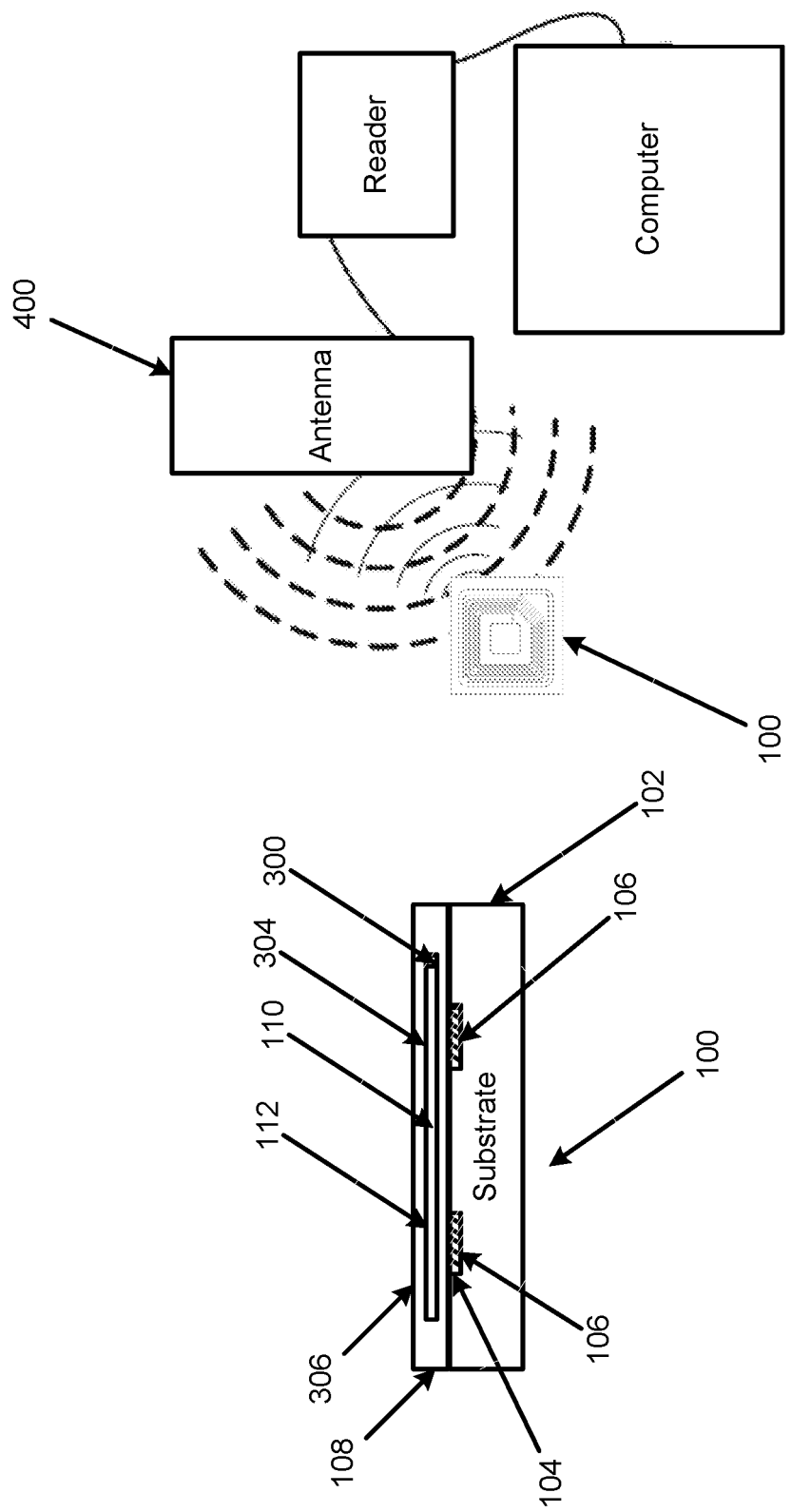
FIG. 4A illustrates a layout of a cutout view of FIG. 2 illustrating a sealed reservoir.
FIG. 4B illustrates another operation of the controllable read blocking based RFID device of FIG. 1, according to an example of the present disclosure.

FIG. 4A illustrates a layout of a cutout view of FIG. 2 illustrating a sealed reservoir, and FIG. 4B illustrates another operation of the device 100, according to an example of the present disclosure.

Referring to FIGS. 1-4B, in a similar manner as FIGS. 3A and 3B, FIGS. 4A and 4B respectively illustrate the device 100, and an antenna 400 to read the device 100. The operation of the device 100 may be similarly controlled by the valve 300 as disclosed with reference to FIGS. 3A and 3B.

Figure 5:
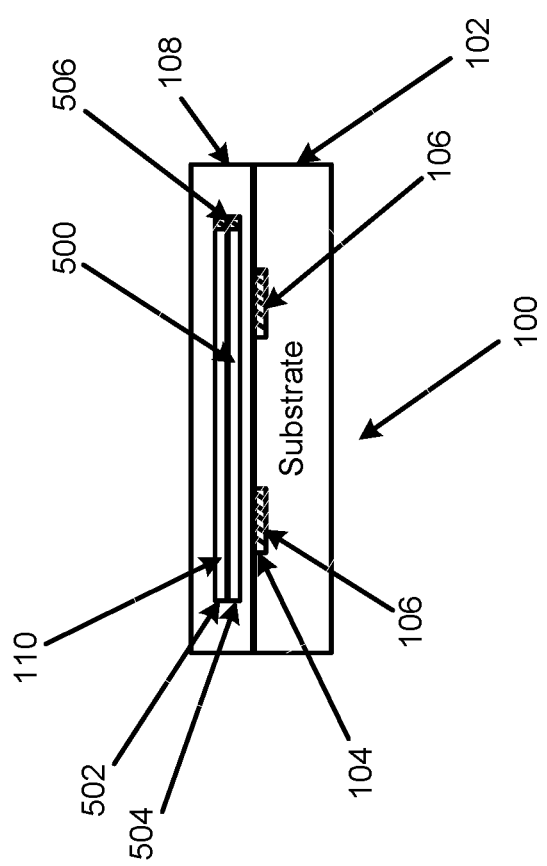
FIG. 5 illustrates a layout illustrating first and second sealed reservoirs to illustrate operation of the controllable read blocking based RFID device of FIG. 1, according to an example of the present disclosure.

FIG. 5 illustrates a layout illustrating first and second sealed reservoirs to illustrate operation of the device 100, according to an example of the present disclosure.

Referring to FIGS. 1-5, and particularly FIG. 5, with respect to the device 100 configured for one-time usage, the fluid 110 may be mixed with another fluid 500 disposed in the controllable read blocking layer 108. For example, if the fluid 110 includes an ionic solution, upon mixing with the other fluid 500, the fluid 110 may be rendered neutral. When the fluid 500 mixes with the fluid 110, the fluid 110 may become diluted to the point where it no longer can block the electromagnetic waves and the device 100 will become readable again. In order to achieve this, the fluid 500 may need to be transparent in the frequencies used for the device 100, but still be miscible with the blocking fluid 110. In this regard, the fluid 110 may be disposed in a sealed reservoir 502, and the other fluid 500 may be disposed in another sealed reservoir 504. When a valve 506 associated with the sealed reservoirs 502 and 504 is opened, the fluid 110 may mix with the other fluid 500 so that the fluid 110 may be rendered neutral. Once the fluid 110 is rendered neutral, the controllable read blocking layer 108 allows for passage of electromagnetic waves to the trace 106 to allow communication of an RFID reading device (e.g., the RFID reading device 302) with the device 100.

With respect to the device 100 configured for one-time usage, for the example of the fluid 110 disposed in the sealed reservoir 502, and the other fluid 500 disposed in another sealed reservoir 504, when the valve 506 associated with the sealed reservoirs 502 and 504 is opened, the fluid 110 may mix with the other fluid 500 so that conductive solvents (e.g., ionic material) in the fluid 110 are, for example, solidified based on precipitation of the conductive solutes. The fluid 110 may include dissolved salts near the solubility limits of the solvent, and when the fluid 500 is introduced to the fluid 110, the secondary solvent destabilizes the ions in solution causing the ions to precipitate out. This precipitation lessens the capability of the fluid 110 to block the electromagnetic frequencies that the device 100 operates at. In this manner, the fluid 110 may be rendered neutral. Once the fluid 110 is rendered neutral, the controllable read blocking layer 108 allows for passage of electromagnetic waves to the trace 106 to allow communication of the RFID reading device with the device 100.

The device 100 which includes the fluid 110 provided for a one-time usage may be used in environments such as shops where associated goods may not need to be identified until the device 100 is configured for identification, during transportation of goods where identification of goods may need to be concealed to prevent theft, for privacy purposes where identification of goods by an unauthorized entity may need to be concealed, for privacy purposes where identification of the device 100 by an unauthorized entity may need to be concealed, to prevent cross-device interference where a RFID reading device may inadvertently identify another RFID device similar to the device 100, etc.

The device 100 may be configured for switchable usage between blocking and allowing passage of electromagnetic waves.

Figure 6:
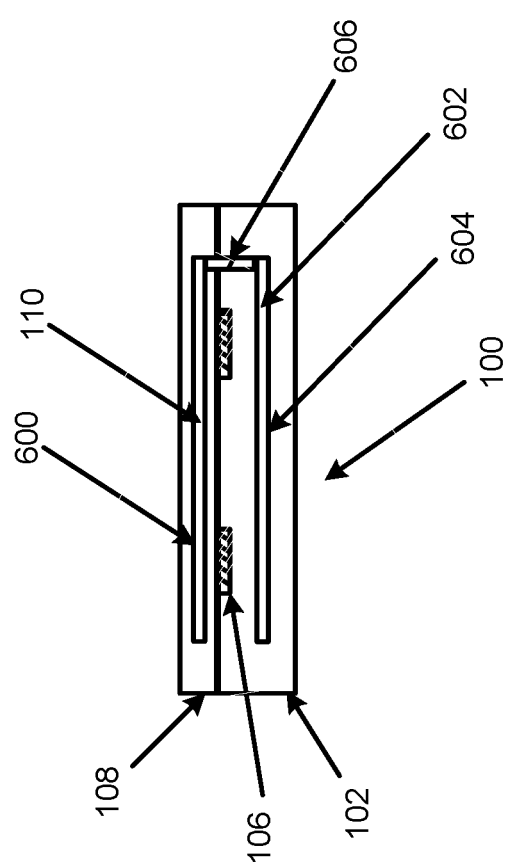
FIG. 6 illustrates another layout illustrating first and second sealed reservoirs to illustrate operation of the controllable read blocking based RFID device of FIG. 1, according to an example of the present disclosure.

With respect to the device 100 which includes switchable usage, FIG. 6 illustrates another layout illustrating first and second sealed reservoirs to illustrate operation of the device 100, according to an example of the present disclosure.

Referring to FIGS. 1, 2, and 6, and particularly FIG. 6, with respect to the device 100 which includes switchable usage, the controllable read blocking layer 108 may include a first fluid 110 disposed in a first sealed reservoir 600 in the controllable read blocking layer 108 to selectively block (e.g., when the first fluid 110 is in the first sealed reservoir 600) or allow (e.g., when the first fluid 110 is not in the first sealed reservoir 600) passage of electromagnetic waves to the trace 106 to respectively inhibit or allow communication of a RFID reading device with the device 100.

The first fluid 110 disposed in the first sealed reservoir 600 may be in controllable communication with a second fluid 602 disposed in a second sealed reservoir 604. For example, a valve 606 may provide for controllable communication of the first fluid 110 in the first sealed reservoir 600 with the second fluid 602 disposed in the second sealed reservoir 604. The controllable communication may thus allow or prevent mixing of the first and second fluids 110 and 602.

As shown in FIG. 6, the first sealed reservoir 600 may be disposed on a side of the device 100 adjacent the trace 106 (i.e., the side of the device 100 which is used for communication with the trace 106), and the second sealed reservoir 604 may be disposed on another side of the device 100 opposite to the trace 106 (i.e., the side of the device 100 which is not used for communication with the trace 106).

The first fluid 110 may include a heavier weight compared to the second fluid 602 so that when the fluids 110 and 602 mix, the fluid 110 sinks below the second fluid 602 (e.g., in a similar manner as water sinks below oil), in the orientation of FIG. 6. Further the first fluid 110 may be configured to block electromagnetic waves, and the second fluid 602 may be configured to allow passage of electromagnetic waves.

Examples of the first fluid 110 may include fluids with aqueous based solvents (e.g., water, low molecular weight alcohol, salt solutions, etc.), and examples of the second fluid 602 may include fluids with non-aqueous based solvents (e.g., organic based solvents, longer carbon chain liquids, oils, etc.).

When the device 100 is oriented in a first configuration such that the heavier weight first fluid 110 is positioned along a plane where the device 100 may receive electromagnetic waves from a RFID reading device (e.g., assuming that the electromagnetic waves are above the device 100 in the orientation of FIG. 6), the electromagnetic waves are blocked. When the device 100 is rotated (e.g., 180°) and thus oriented in a second configuration such that the lighter second fluid 602 is positioned along the plane where the device 100 may receive electromagnetic waves from a RFID reading device, the electromagnetic waves are allowed.

With respect to the device 100 which includes switchable usage between blocking and allowing passage of electromagnetic waves, for the example including the first fluid 110 which includes a heavier weight compared to the second fluid 602, the device 100 may remain in a blocking state where the heavier weight fluid 110 is positioned along a plane where the device 100 may receive electromagnetic waves from a RFID reading device, until the valve 606 is opened. For example, the valve 606 may be opened by breaking a seal between the first sealed reservoir 600 and the second sealed reservoir 604, or otherwise opening the valve 606 between the first sealed reservoir 600 and the second sealed reservoir 604. In this manner, once the valve 606 is opened, when the device 100 is oriented in a first configuration such that the heavier weight fluid 110 is positioned along a plane where the device 100 may receive electromagnetic waves from a RFID reading device, the electromagnetic waves are blocked. When the device 100 is rotated (e.g., 180° in the orientation of FIG. 6) and thus oriented in a second configuration such that the lighter second fluid 602 is positioned along the plane where the device 100 may receive electromagnetic waves from a RFID reading device, the electromagnetic waves are allowed.

Referring again to FIGS. 1 and 2, the controllable read blocking layer 108 may further include a conductive tape (e.g., made of aluminum, or another material) to physically cover the controllable read blocking layer 108. In this manner, the conductive tape may provide another level of security against unauthorized reading of the device 100. When the device 100 is to be read, the conductive tape may be removed (e.g., by peeling) from the controllable read blocking layer 108, and the device 100 may be operated to allow communication of a RFID reading device as disclosed herein. Alternatively, the controllable read blocking layer 108 may be provided without a fluid reservoir as disclosed herein, in which case when the device 100 is to be read, the conductive tape may be removed (e.g., by peeling) from the controllable read blocking layer 108.

Figure 7:
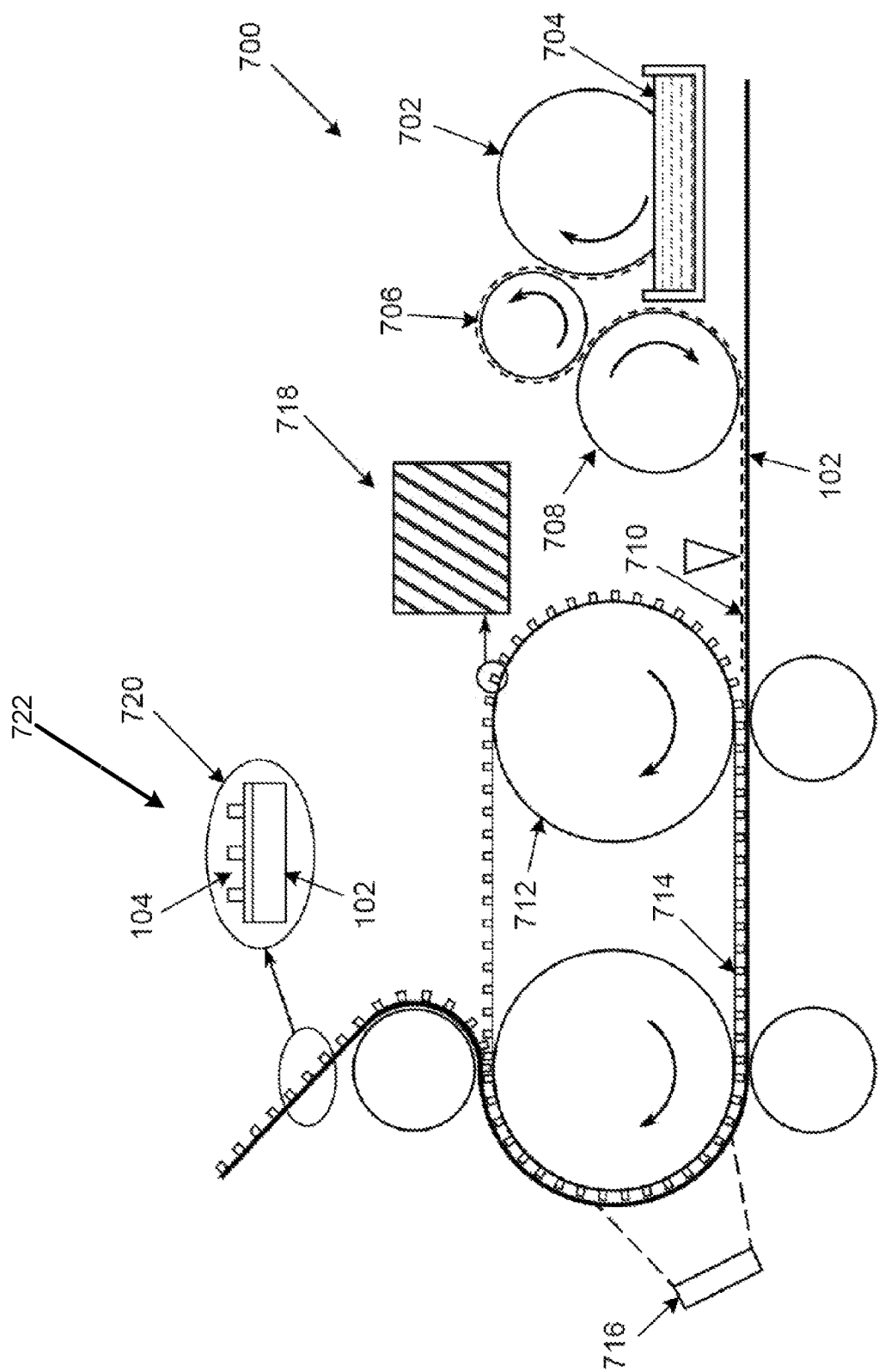
FIG. 7 illustrates a roll to roll manufacturing technique for forming the controllable read blocking based RFID device of FIGS. 1-6, according to an example of the present disclosure.

FIG. 7 illustrates a roll to roll manufacturing technique for forming the device 100 of FIGS. 1-6, according to an example of the present disclosure.

Referring to FIG. 7, the roll to roll manufacturing technique of FIG. 7 may represent a roll to roll imprint process for formation of the device 100. The roll to roll manufacturing technique may start at 700 where a coating roller 702 in contact with liquid resist 704 transfers the liquid resist onto rollers 706 and 708, which then transfer the liquid resist 704 onto the substrate layer 102. A layer of the liquid resist at 710 may be imprinted by rollers 712 and 714, and further cured by an ultraviolet (UV) source at 716. For the device 100 that includes channels 104, the mold 718 associated with the rollers 712 and 714 may be formed to imprint the channel 104 into the substrate layer 102. The mold 718 may be formed of an Ethylene tetrafluoroethylene (ETFE) material, and other such materials. The imprinted layer at 720 may represent the substrate layer 102 which includes the imprinted channel 104. At 722, once the trace 106 is formed, the controllable read blocking layer 108 may be further attached onto the substrate layer 102.

Figure 8:
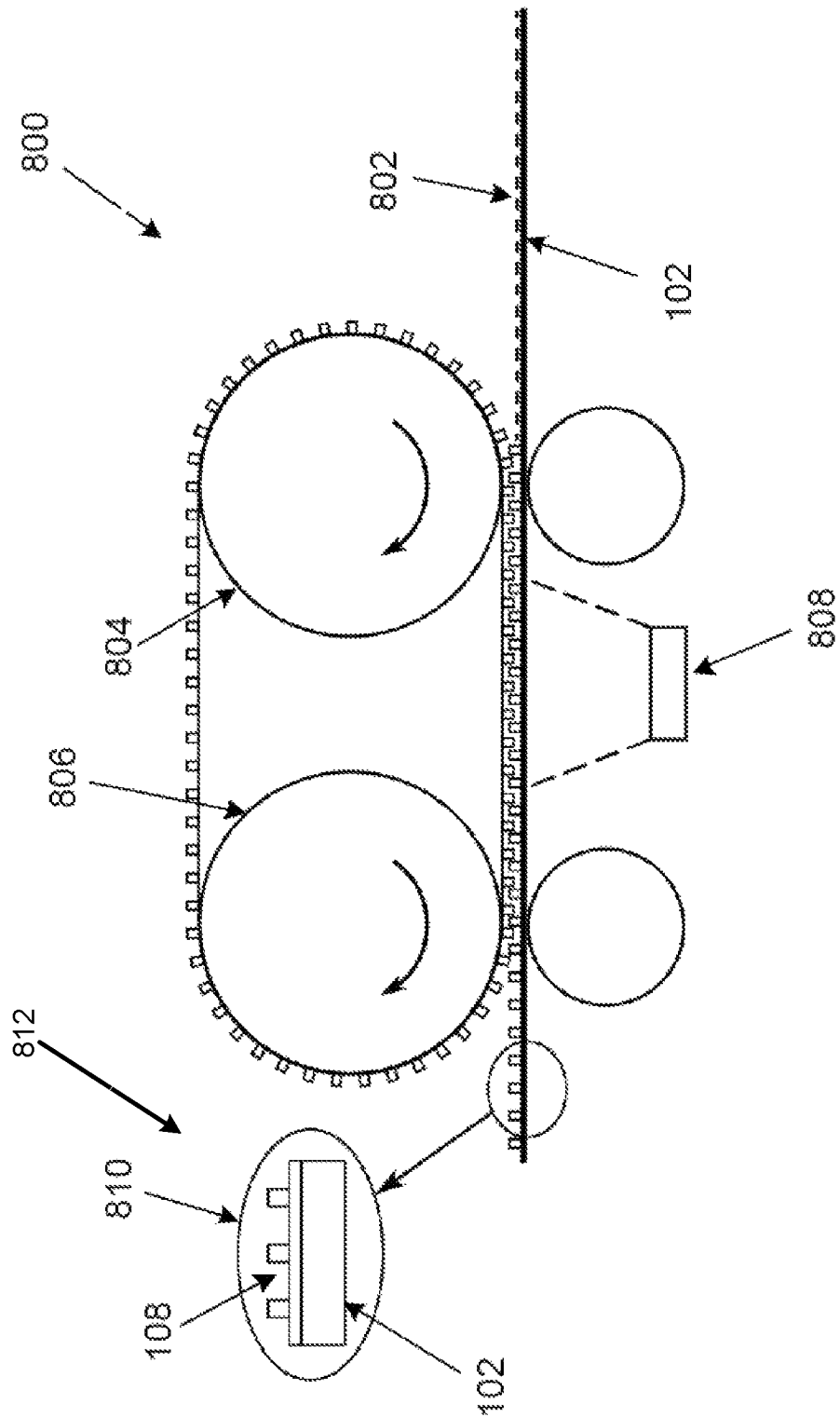
FIG. 8 illustrates another roll to roll manufacturing technique for forming the controllable read blocking based RFID device of FIGS. 1-6, according to an example of the present disclosure.

FIG. 8 illustrates another roll to roll manufacturing technique for forming the RFID device of FIGS. 1-6, according to an example of the present disclosure.

Referring to FIG. 8, the roll to roll manufacturing technique of FIG. 8 may represent a roll to roll imprint process for formation of the device 100. The roll to roll manufacturing technique may start at 800 where a layer of liquid resist at 802 on the substrate layer 102 may be imprinted by rollers 804 and 806, and further cured by a UV source at 808. The imprinted layer at 810 may represent the flexible (or rigid) substrate layer 102 which includes the imprinted channel 104. At 812, once the trace 106 is formed, the controllable read blocking layer 108 may be further attached onto the substrate layer 102.

With respect to the roll to roll manufacturing techniques of FIGS. 7 and 8, other techniques such as nano-imprinting may be used without departing from the scope of the techniques described with respect to FIGS. 7 and 8. Further, the roll to roll manufacturing techniques of FIGS. 7 and 8 may represent in-situ processes where the entire device 100 are produced from start to finish, without components of the device 100 needing to be transferred between different machines.

Figure 9:
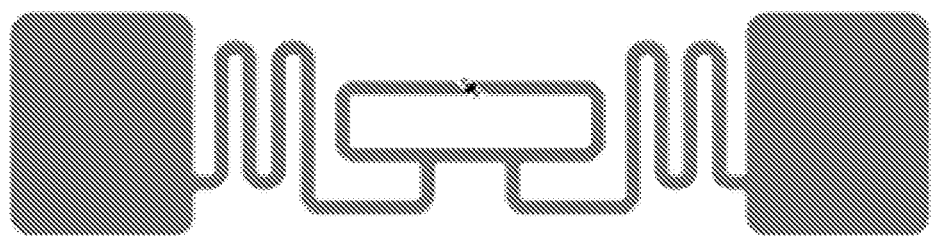
FIG. 9 illustrates a layout of a controllable read blocking based RFID device, including an ultra high frequency (UHF), according to an example of the present disclosure.

FIG. 9 illustrates a layout of a controllable read blocking based RFID device, including an ultra high frequency (UHF), according to an example of the present disclosure. Compared to FIG. 1 which illustrates a high frequency (HF) configuration, FIG. 9 illustrates a UHF configuration.

Figure 10:
FIG. 10 illustrates a flowchart of a method for forming a controllable read blocking based RFID device, according to an example of the present disclosure.

FIG. 10 illustrates a flowchart of a method for forming the device 100, according to an example of the present disclosure.

Referring to FIGS. 1-10, and particularly FIG. 10, for the method 1000, at block 1002, the method may include forming a trace 106 that includes a conductive material. The trace 106 may be disposed on, partially within, or fully within the substrate layer 102.

At block 1004, the method may include placing the fluid 110 in the controllable read blocking layer 108 disposed on the substrate layer 102 and the trace 106 to selectively block or allow passage of electromagnetic waves to the trace 106 to respectively inhibit or allow communication of a RFID reading device with the device 100.

According to an example, for the method 1000, placing the fluid 110 in the controllable read blocking layer 108 disposed on the substrate layer 102 and the trace 106 to selectively block or allow passage of electromagnetic waves to the trace 106 to respectively inhibit or allow communication of the RFID reading device with the device 100 may further include placing the fluid 110 in the controllable read blocking layer 108 disposed on the substrate layer 102 and the trace 106 to allow passage of electromagnetic waves to the trace 106 to allow communication of the RFID reading device with the device 100 upon opening of a valve (e.g., see FIG. 3A) connected to a sealed reservoir that includes the fluid 110 to release the fluid 110 from the sealed reservoir.

According to an example, for the method 1000, the controllable read blocking layer may include a permeable material to provide for passage of the fluid 110 upon release of the fluid 110 from a sealed reservoir in the controllable read blocking layer 108 and/or a desiccating material to provide for desiccation of the fluid 110 upon release of the fluid 110 from the sealed reservoir (e.g., see discussion with respect to FIG. 3A).

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A controllable read blocking based radio-frequency identification (RFID) device comprising:

a substrate layer;
a trace formed of a conductive material and disposed on, partially within, or fully within the substrate layer; and
a controllable read blocking layer disposed on the substrate layer and the trace and including a fluid disposed in the controllable read blocking layer to selectively block or allow passage of electromagnetic waves to the trace to respectively inhibit or allow communication of a RFID reading device with the controllable read blocking based RFID device.

2. The controllable read blocking based RFID device according to claim 1, wherein the controllable read blocking layer includes a sealed reservoir including the fluid, further comprising:
a valve operably connected to the sealed reservoir to release the fluid from the sealed reservoir upon actuation of the valve to allow passage of electromagnetic waves to the trace to allow communication of the RFID reading device with the controllable read blocking based RFID device.

3. The controllable read blocking based RFID device according to claim 1, wherein
the controllable read blocking layer includes a sealed reservoir including the fluid, and
the sealed reservoir is formed of a material that is pierceable to release the fluid from the sealed reservoir to allow passage of electromagnetic waves to the trace to allow communication of the RFID reading device with the controllable read blocking based RFID device.

4. The controllable read blocking based RFID device according to claim 1, wherein
the controllable read blocking layer includes a sealed reservoir including the fluid,
the controllable read blocking layer includes a permeable material to provide for passage of the fluid upon release of the fluid from the sealed reservoir, and
the controllable read blocking layer allows for passage of electromagnetic waves to the trace to allow communication of the RFID reading device with the controllable read blocking based RFID device upon release of the fluid from the sealed reservoir.

5. The controllable read blocking based RFID device according to claim 1, wherein
the controllable read blocking layer includes a sealed reservoir including the fluid,
the controllable read blocking layer includes a desiccating material to provide for desiccation of the fluid upon release of the fluid from the sealed reservoir, and
the controllable read blocking layer allows for passage of electromagnetic waves to the trace to allow communication of the RFID reading device with the controllable read blocking based RFID device upon release of the fluid from the sealed reservoir.

6. The controllable read blocking based RFID device according to claim 1, wherein
the controllable read blocking layer includes a sealed reservoir including the fluid and a further sealed reservoir including a further fluid, and
upon mixing of the fluid in the sealed reservoir with the further fluid in the further sealed reservoir, the fluid in the sealed reservoir is rendered neutral and the controllable read blocking layer allows for passage of electromagnetic waves to the trace to allow communication of the RFID reading device with the controllable read blocking based RFID device.

7. The controllable read blocking based RFID device according to claim 1, wherein the controllable read blocking layer includes a sealed reservoir including the fluid and a further sealed reservoir including a further fluid, and
upon mixing of the fluid in the sealed reservoir with the further fluid in the further sealed reservoir, conductive solvents in the fluid in the sealed reservoir are solidified to render the fluid in the sealed reservoir neutral and the controllable read blocking layer allows for passage of electromagnetic waves to the trace to allow communication of the RFID reading device with the controllable read blocking based RFID device.

8. The controllable read blocking based RFID device according to claim 1, wherein the fluid includes aqueous based solvents.

9. A controllable read blocking based radio-frequency identification (RFID) device comprising:
a substrate layer;
a trace formed of a conductive material and disposed on, partially within, or fully within the substrate layer; and
a controllable read blocking layer disposed on the substrate layer and the trace and including a first fluid disposed in a first sealed reservoir in the controllable read blocking layer to selectively block or allow passage of electromagnetic waves to the trace to respectively inhibit or allow communication of a RFID reading device with the controllable read blocking based RFID device, wherein
the first fluid disposed in the first sealed reservoir is in controllable communication with a second fluid disposed in a second sealed reservoir, and
the controllable communication allows or prevents mixing of the first and second fluids.

10. The controllable read blocking based RFID device according to claim 9, wherein
the first sealed reservoir is disposed on a first side of the controllable read blocking based RFID device,
the second sealed reservoir is disposed on a second side of the controllable read blocking based RFID device that is different than the first side,
orientation of the controllable read blocking based RFID device in a first configuration blocks passage of electromagnetic waves to the trace to inhibit communication of the RFID reading device with the controllable read blocking based RFID device, and
orientation of the controllable read blocking based RFID device in a second configuration that is different than the first configuration allows passage of electromagnetic waves to the trace to allow communication of the RFID reading device with the controllable read blocking based RFID device.

11. The controllable read blocking based RFID device according to claim 9, wherein the first fluid disposed in the first sealed reservoir includes a heavier weight compared to the second fluid disposed in the second sealed reservoir.

12. The controllable read blocking based RFID device according to claim 9, wherein the first fluid disposed in the first sealed reservoir interacts with the second fluid disposed in the second sealed reservoir when a valve associated with at least one of the first and second sealed reservoirs is opened for the controllable communication to allow mixing of the first and second fluids.

13. A method for forming a controllable read blocking based radio-frequency identification (RFID) device, the method comprising:
forming a trace that includes a conductive material, wherein the trace is disposed on, partially within, or fully within a substrate layer; and placing a fluid in a controllable read blocking layer disposed on the substrate layer and the trace to selectively block or allow passage of electromagnetic waves to the trace to respectively inhibit or allow communication of a RFID reading device with the controllable read blocking based RFID device.

14. The method according to claim 13, wherein placing the fluid in the controllable read blocking layer disposed on the substrate layer and the trace to selectively block or allow passage of electromagnetic waves to the trace to respectively inhibit or allow communication of the RFID reading device with the controllable read blocking based RFID device further comprises:

placing the fluid in the controllable read blocking layer disposed on the substrate layer and the trace to allow passage of electromagnetic waves to the trace to allow communication of the RFID reading device with the controllable read blocking based RFID device upon opening of a valve connected to a sealed reservoir that includes the fluid to release the fluid from the sealed reservoir.

15. The method according to claim 13, wherein placing the fluid in the controllable read blocking layer disposed on the substrate layer and the trace to selectively block or allow passage of electromagnetic waves to the trace to respectively inhibit or allow communication of the RFID reading device with the controllable read blocking based RFID device further comprises:

placing the fluid in the controllable read blocking layer disposed on the substrate layer and the trace to selectively block or allow passage of electromagnetic waves to the trace to respectively inhibit or allow communication of the RFID reading device with the controllable read blocking based RFID device, wherein the controllable read blocking layer includes at least one of a permeable material to provide for passage of the fluid upon release of the fluid from a sealed reservoir in the controllable read blocking layer and a desiccating material to provide for desiccation of the fluid upon release of the fluid from the sealed reservoir.

* * * * *